United States Patent [19]
De Soete

[11] Patent Number: 5,540,902
[45] Date of Patent: Jul. 30, 1996

[54] PROCESS FOR CLEANING A GAS CONTAINING NITROGEN MONOXIDE AND SULPHUR DIOXIDE

[75] Inventor: Gérard De Soete, Colombes, France

[73] Assignee: Solvay (Société Anonyme), Brussels, Belgium

[21] Appl. No.: 211,081

[22] PCT Filed: Sep. 18, 1992

[86] PCT No.: PCT/EP92/02172

§ 371 Date: Jun. 22, 1994

§ 102(e) Date: Jun. 22, 1994

[87] PCT Pub. No.: WO93/06915

PCT Pub. Date: Apr. 15, 1993

[30] Foreign Application Priority Data

Sep. 30, 1991 [FR] France ................................. 91 12097

[51] Int. Cl.$^6$ ................................................ C01B 21/02
[52] U.S. Cl. .................................. 423/239.1; 423/244.07
[58] Field of Search ........................... 423/239.1, 244.07

[56] References Cited

U.S. PATENT DOCUMENTS

| | | | |
|---|---|---|---|
| 4,839,147 | 6/1989 | Lindbauer et al. | 423/235 |
| 5,002,741 | 3/1991 | Hooper | 423/239 |
| 5,165,902 | 11/1992 | Bortz et al. | 423/235 |

FOREIGN PATENT DOCUMENTS

| | | |
|---|---|---|
| 0077170 | 4/1983 | European Pat. Off. . |
| 0301272 | 2/1989 | European Pat. Off. . |
| 1166704 | 10/1969 | United Kingdom . |
| 86/06711 | 11/1986 | WIPO . |

*Primary Examiner*—Gary P. Straub
*Assistant Examiner*—Thomas G. Dunn, Jr.
*Attorney, Agent, or Firm*—Spencer & Frank

[57] ABSTRACT

Process for cleaning a gas containing sulphur dioxide and nitrogen monoxide, in which a quantity of oxygen is employed in the gas which is at least equal to the stoichiometric quantity required to oxidize the nitrogen monoxide to nitrogen dioxide and the gas is treated with an alkali metal bicarbonate. The process applies to the cleaning of fumes generated by the combustion of sulphur-containing fossil fuels, in electricity-producing power stations.

12 Claims, 5 Drawing Sheets

PROCESS FOR CLEANING A GAS CONTAINING NITROGEN MONOXIDE AND SULPHUR DIOXIDE

The invention relates to the cleaning of gases to remove toxic impurities, and especially to the cleaning of fumes from power stations prior to being expelled into the atmosphere.

It relates more particularly to a process for cleaning a gas to remove oxides of nitrogen, especially nitrogen monoxide (NO), and to remove sulphur dioxide.

Fossil fuels (coal, coke, petrol, petroleum derivatives) usually contain sulphur or sulphur compounds, and also nitrogen compounds. Consequently, the fumes generated by their combustion in air or in the presence of oxygen are usually contaminated with sulphur dioxide and with oxides of nitrogen. In these fumes, nitrogen monoxide (NO) constitutes the majority of the oxides of nitrogen, the remainder consisting principally of nitrogen dioxide ($NO_2$).

The high toxicity of sulphur dioxide, nitrogen monoxide and nitrogen dioxide means that they have to be removed from the fumes before the latter are expelled into the atmosphere.

In U.S. Pat. No. 4,838,147 (Waagner Biro AG) a process is proposed for cleaning fumes to remove oxides of nitrogen, according to which alkali metal sulphite and ammonia gas are introduced into the fumes so as to reduce the oxides of nitrogen to dinitrogen monoxide ($N_2O$) which is subsequently reduced to nitrogen by the ammonia. In the case where the fumes simultaneously contain oxides of nitrogen and sulphur dioxide, the alkali metal sulphite is formed in situ in the fumes by introducing into the latter an alkali metal bicarbonate or carbonate.

The disadvantage of this known process is that it necessitates the use of a number of reagents, including a gaseous reagent (ammonia) whose toxic nature implies extensive safety measures.

International Patent Application WO 86/06711 describes a two-stage process for cleaning a gas containing sulphur dioxide, nitrogen monoxide and nitrogen dioxide. In a first step, a mixture of oxygen and a hydrocarbon is introduced into the gas to be cleaned, which is maintained at a high temperature (greater than 800° F. or 700 K), so as to oxidize the nitrogen monoxide to nitrogen dioxide via the intermediacy of peroxyl ions; in a second step, the gas collected from the first step is treated with sodium bicarbonate in order to remove from it sulphur dioxide and nitrogen dioxide, with the formation of sodium sulphite, sodium sulphate, sodium nitrate and nitrogen.

This known process has the disadvantage of requiring a number of reagents (oxygen, hydrocarbon, sodium bicarbonate). It has the additional disadvantage of necessitating a complex set-up for the injection of a mixture of oxygen and hydrocarbon into a gas at high temperature (greater than 700 K).

SUMMARY OF THE INVENTION

The invention overcomes the disadvantages of the known processes described above by providing a new process which enables efficient cleaning of a gas to remove nitrogen monoxide and sulphur dioxide to be effected by means of an alkali metal bicarbonate, without requiring any costly or dangerous additional reagent, and which, moreover, can be employed at moderate temperature.

Consequently, the invention relates to a process for cleaning a gas containing nitrogen monoxide and sulphur dioxide by means of an alkali metal bicarbonate, according to which a quantity of oxygen is employed in the gas which is at least equal to the stoichiometric quantity required to oxidize the nitrogen monoxide to nitrogen dioxide.

The invention applies to all gases which simultaneously contain nitrogen monoxide (NO) and sulphur dioxide ($SO_2$). It applies especially to the gases generated by the combustion of combustible materials in the presence of air or oxygen. Hereinafter, a gas originating from the combustion of a combustible material will be called "fumes". In the case where the invention is applied to fumes, the combustible material is not critical and may equally be a gas, a liquid or a solid. It may contain a fossil fuel (such as natural gas, petroleum and its derivatives, coal and coke), biomass, or flammable inorganic or organic substances originating, for example, from household or municipal waste. The origin of the fumes is likewise not critical, and they may originate, for example, from an electricity-producing power station, from a centralized plant for long-distance heating, or from a plant for the incineration of household or municipal refuse.

The gas treated in the process according to the invention necessarily contains sulphur dioxide and nitrogen monoxide (NO). It may also contain other oxides of nitrogen besides nitrogen monoxide, for example dinitrogen monoxide ($N_2O$), dinitrogen trioxide ($N_2O_3$), dinitrogen pentoxide ($N_2O_5$) and nitrogen dioxide ($NO_2$). Hereinafter, the oxides of nitrogen in the gas will be designated in their entirety by the term $NO_x$. As a general rule, the volume fraction of nitrogen monoxide (NO) in the entirety of the oxides of nitrogen ($NO_x$) in the gas is at least 50% and generally greater than 75%; it may be 100%. As a variant, the gas may contain other compounds.

In accordance with the invention, a quantity of oxygen is employed in the gas which is at least equal to the stoichiometric quantity corresponding to that quantity which would be required in theory to oxidize the nitrogen monoxide to nitrogen dioxide in accordance with the reaction:

$$2\ NO + O_2 \rightarrow 2\ NO_2$$

Nevertheless, in the process according to the invention, the essential function of the oxygen is not to oxidize the nitrogen monoxide to nitrogen dioxide, and consequently it coexists with the nitrogen monoxide within the gas, in a quantity which is at least equal to the stoichiometric quantity theoretically necessary for this oxidation. According to the invention, the molar ratio of $O_2$:NO in the gas must consequently be at least 0.5. In practice, it has proved desirable to bring about within the gas a molar ratio of $O_2$:NO which is greater than 1 and preferably at least 2, values greater than 2.5 being recommended. Although the process according to the invention imposes no upper limit on the content of oxygen in the gas, there is no advantage in exceeding a molar ratio of $O_2$:NO of 100, in order not to increase pointlessly the volume of gas to be treated. Values greater than 3.5 are generally suitable, with those greater than 5 being preferred. The oxygen can be employed in the pure form or, more simply, in the form of ambient air. In the case where the gas treated is fumes, the oxygen can be provided by an excess of air which is passed into the site of combustion of the fuel; it is also possible to introduce air into the fumes downstream of the combustion site.

Without wishing to be bound by a theoretical explanation, the inventor believes that the cleaning of the gas to remove nitrogen monoxide and nitrogen dioxide by the alkali metal bicarbonate occurs via the intermediate formation of alkali metal pyrosulphite, in accordance with the following reactions in which M denotes an alkali metal:

$$2\ MHCO_3 + 2\ SO_2 \rightarrow M_2S_2O_5 + H_2O + 2\ CO_2$$

$$M_2S_2O_5 + 2\ NO_2 \rightarrow MNO_2 + MNO_3 + 2\ SO_2$$

$$M_2S_2O_5 + 2\ NO + O_2 \rightarrow MNO_2 + MNO_3 + 2\ SO_2$$

Consequently, the quantity of sulphur dioxide in the gas must be at least equal to the theoretical quantity necessary to form, by reaction with the alkali metal bicarbonate, a sufficient quantity of alkali metal pyrosulphite to consume all of the nitrogen monoxide and nitrogen dioxide in the gas and to form alkali metal nitrate and nitrite in accordance with the abovementioned reactions. As a general rule, it is therefore necessary for the gas to contain equal quantities (expressed in moles) of sulphur dioxide, oxides of nitrogen $NO_x$ and alkali metal bicarbonate. However, it is observed that, once the process has started, it liberates a quantity of sulphur dioxide which is equal to that which it consumes. In practice it has been shown to be desirable to bring about, within the gas being cleaned, a molar ratio of $SO_2$:NO which is greater than 0.2 and is preferably at least 0.5. Although the process does not impose an upper limit on the content of sulphur dioxide, there is no advantage in exceeding a molar ratio of $SO_2$:NO of 3, in order not to increase pointlessly the volume of fumes to be treated. A molar ratio of $SO_2$:NO of between 1 and 2 has proved especially advantageous.

Practical experience indicates that, in order for efficient cleaning to remove oxides of nitrogen $NO_x$, it is desirable to bring about within the gas being cleaned a volume concentration of oxygen of at least 0.06%, and preferably greater than 0.1%, and a volume concentration of sulphur dioxide of at least 100 ppm (parts per million), preferably greater than 200 ppm. Volume concentrations greater than 0.15% of oxygen and greater than 350 ppm of sulphur dioxide in the gas are highly suitable, with those of at least 0.25% of oxygen and 500 ppm of sulphur dioxide being especially advantageous. It has been shown in general to be pointless to exceed volume concentrations of 750 ppm of sulphur dioxide in the gas, and consequently values of between 600 and 750 ppm of sulphur dioxide are satisfactory. As regards oxygen, large quantities can be employed without impairing the ready progress of the process. Most frequently, the volume concentration of oxygen in the gas does not exceed 10%.

The alkali metal bicarbonate must be employed in a quantity greater than 0.5 mol, preferably at least 0.8 mol, per mole of nitrogen monoxide in the gas to be cleaned. In the case where the gas to be cleaned contains nitrogen monoxide and nitrogen dioxide, the alkali metal bicarbonate must be employed in a quantity greater than 0.5 mol, preferably at least 0.8 mol, per mole of nitrogen monoxide and nitrogen dioxide in the gas. In principle, no upper limit is imposed on the quantity of alkali metal bicarbonate which is used. In practice, because of economic considerations, there is no advantage in exceeding 100 mol (preferably 10 mol) of alkali metal bicarbonate per mole of oxide of nitrogen ($NO_x$) in the gas to be cleaned, values of between 0.8 and 5 mol being specially recommended and those of between 1 and 3 mol being most advantageous.

In carrying out the process according to the invention, the temperature must generally be greater than 250 K and preferably at least 300 K. Temperatures of between 300 and 700 K are suitable. Those of between 350 and 550 K are preferred and, among these temperatures, those of between 400 and 500 K are especially advantageous.

In the process according to the invention, the gas can be treated with the alkali metal bicarbonate via a wet or dry route. In treatment by the wet route, the gas is washed with an aqueous suspension or solution of alkali metal bicarbonate. In treatment via the dry route, which is preferred, the alkali metal bicarbonate is employed in solid form in the gas, in the absence of liquid, especially water. In treatment by the dry route, various modes of operation can be utilized. According to a first mode of operation, the alkali metal bicarbonate is injected in the form of a powder into the gas, inside a reaction chamber. According to a second mode of operation, the gas is circulated in a fixed bed, a moving bed or a fluidized bed of particles of alkali metal bicarbonate. These modes of operation are well known in the art of chemical engineering. In these modes of operation, there is advantage in using a powder of uniform particle size which is as fine as possible, so as to accelerate the reaction of the alkali metal bicarbonate with the sulphur dioxide and the oxides of nitrogen in the gas. As a general rule, it is recommended to use a powder with a mean particle diameter of less than 250 μm. The preferred particle size corresponds to a mean particle diameter of no greater than 200 μm, for example of between 5 and 150 μm.

In the process according to the invention, the alkali metal bicarbonate may be, for example, sodium bicarbonate, potassium bicarbonate, caesium bicarbonate or mixtures thereof. Sodium bicarbonate is preferred, The process according to the invention results in the formation of a solid residue comprising alkali metal nitrite, alkali metal nitrate and, possibly, alkali metal sulphate. This residue can easily be removed by treating the gas with a suitable dust extraction device which may, for example, comprise an electrostatic filter. In the case of treatment by a dry route according to the definition given above, it is possible to use a filter containing filter cloths (bag filter) of optimum efficiency.

The process according to the invention applies to the cleaning of all gases containing oxides of nitrogen $NO_x$ and sulphur dioxide. It finds an advantageous application in the cleaning of fumes originating from the incineration of household or municipal refuse, and to the cleaning of fumes emitted by the combustion of sulphur-containing fossil fuels, such as coal and petroleum derivatives. It applies in particular to the cleaning of fumes originating from electricity-producing power stations.

The following examples serve to illustrate the invention. They are explained with reference to the attached drawings.

FIRST SERIES OF EXAMPLES

Examples 1 to 3 described below are in accordance with the invention and relate to the treatment of a gas containing argon, nitrogen monoxide and sulphur dioxide using alkali metal bicarbonate.

Example 1

A synthetic gas was prepared consisting essentially of argon, nitrogen monoxide, sulphur dioxide and oxygen and having the following composition by volume:

NO: 412 µl/l of gas, $SO_2$: 675 µl/l of gas $O_2$: 22,940 µl/l of gas.

A bed was also prepared of 6 g of sodium bicarbonate particles resting on a horizontal grid. The sodium bicarbonate particles used for the bed had a mean diameter of approximately 100 µm. The gas was passed through the bed with a uniform ascending motion, at a speed regulated so as to fluidize the bed.

The temperature within the bed was raised gradually from 300 K to 700 K.

Figure 1:
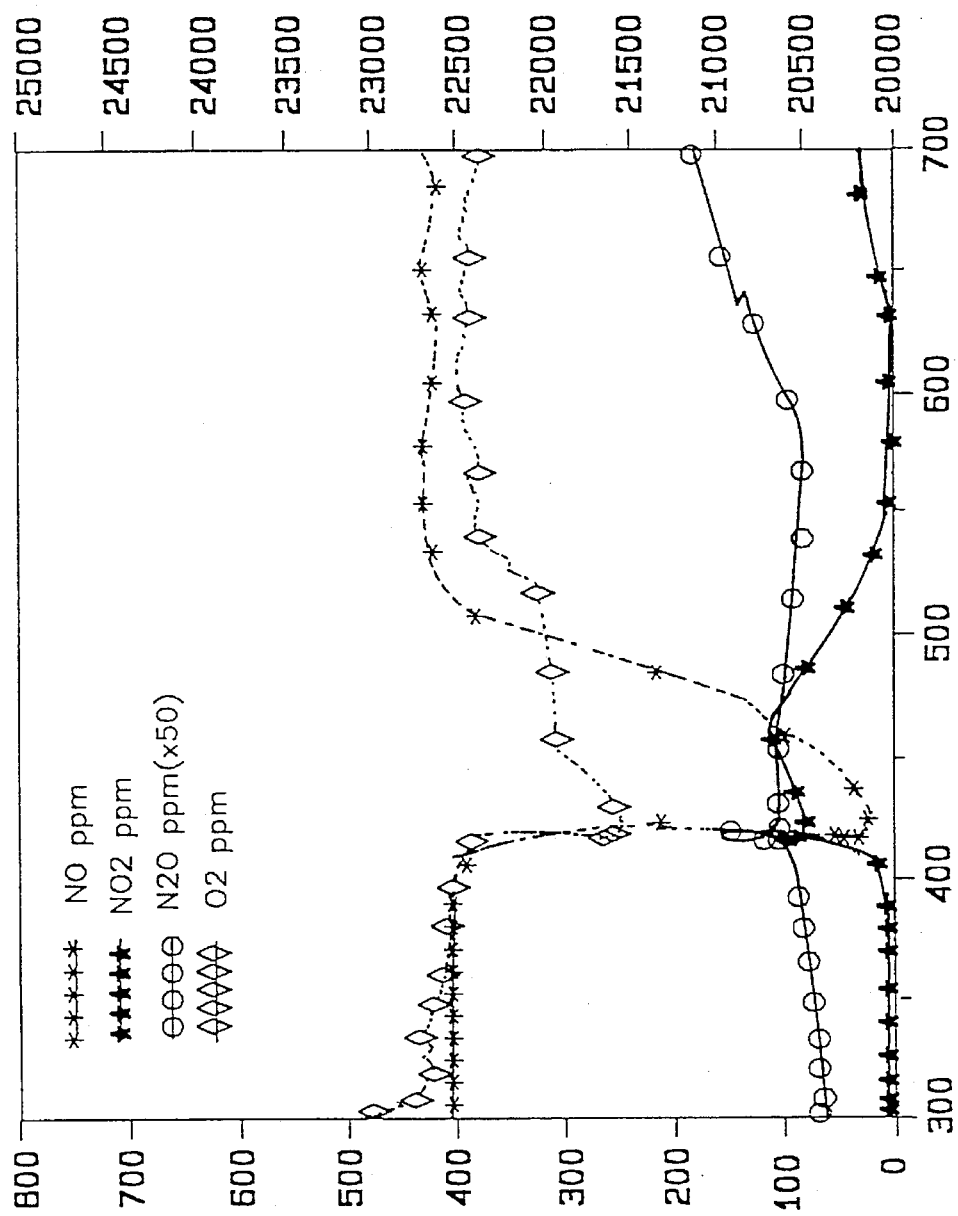
FIGS. 1, 2 and 3 are three diagrams indicating the composition of gases containing oxides of nitrogen ($NO_x$) and sulphur dioxide.

The results of the test are reproduced in the diagram of FIG. 1, where the abscissa represents the temperature of the gas on entering the bed (expressed in kelvins), the left-hand ordinate represents the volume concentration of each of the constituents NO, $NO_2$ and $N_2O$ in the gas on leaving the bed (these concentrations being expressed in ppm or µl of constituent per l of gas and requiring division by 50 in the case of $N_2O$) and the right-hand ordinate represents the volume concentration of oxygen in the gas leaving the bed (expressed in ppm or µl of oxygen per l of gas).

It is observed that the gas has undergone optimum cleaning at temperatures of between about 400 and 450 K. At a temperature of approximately 420 K, the gas leaving the bed had the following approximate composition:

NO: 20 µl/l;

$NO_2$: 70 µl/l;

$N_2O$ : 2 µl/l;

$O_2$: 21,500 µl/l.

Example 2

The test of Example 1 was repeated, this time using a bed of potassium bicarbonate. The gas introduced into the bed consisted of a mixture of argon, nitrogen monoxide, sulphur dioxide and oxygen, having the following composition:

NO: 415 µl/l of gas, $SO_2$: 675 µl/l of gas, $O_2$: 22,907 µl/l of gas.

The temperature within the bed was raised gradually from 300 K to 800 K.

Figure 2:
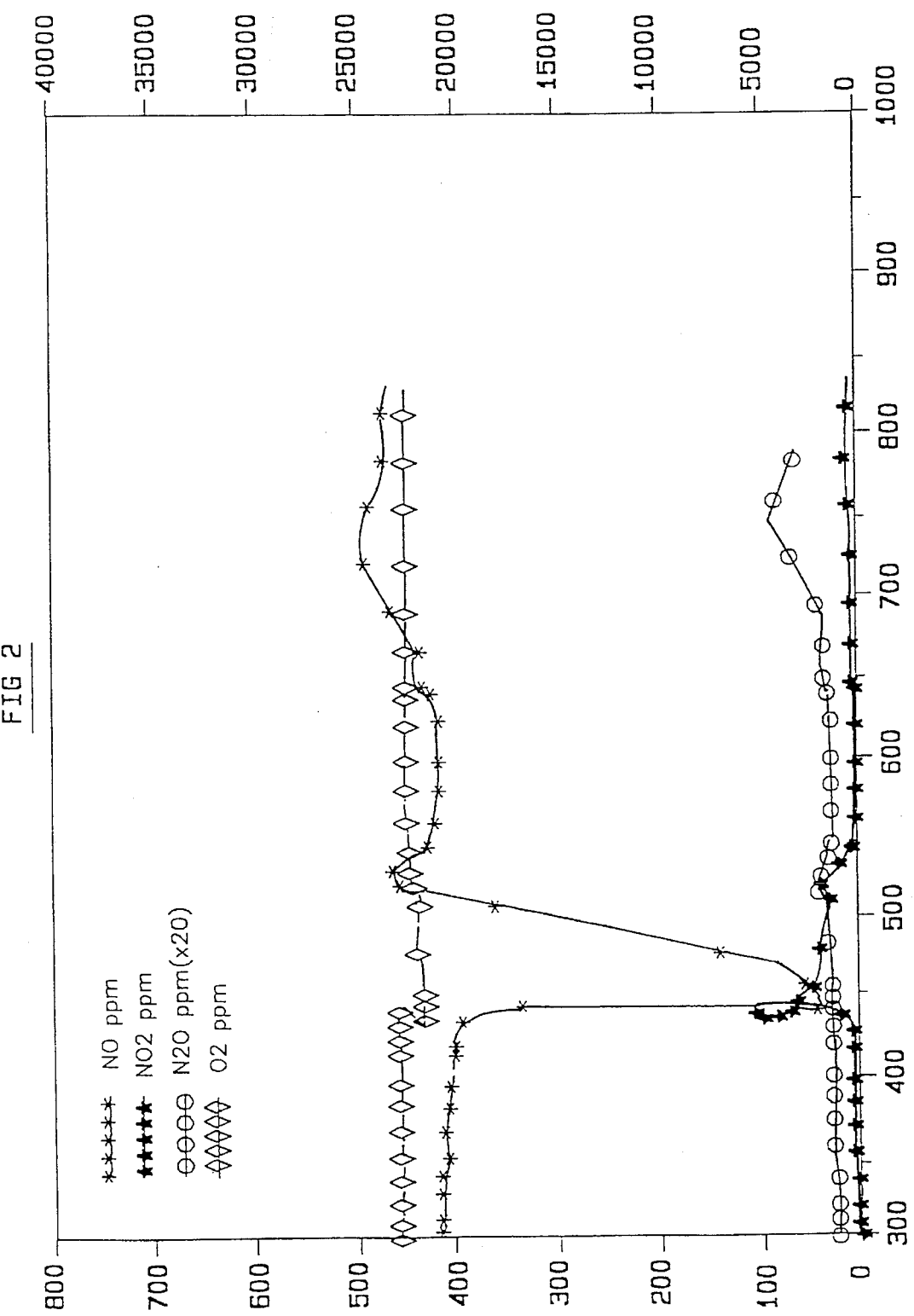

The results of the test are reproduced in the diagram of FIG. 2, where the abscissa represents the temperature of the gas on entering the bed (expressed in kelvins), the left-hand ordinate represents the volume concentration of each of the constituents NO, $NO_2$ and $N_2O$ in the gas on leaving the bed (these volume concentrations being expressed in ppm or µl of constituent per l of gas and requiring division by 20 in the case of $N_2O$) and the right-hand ordinate represents the volume concentration of oxygen in the gas on leaving the bed (expressed in ppm or µl of oxygen per l of gas).

It is observed that the gas has undergone optimum cleaning at temperatures of between approximately 400 and 500 K.

Example 3

The test of Example 1 was repeated, this time using a bed of caesium bicarbonate. The gas introduced into the bed consisted of a mixture of argon, nitrogen monoxide, sulphur dioxide and oxygen, having the following composition:

NO: 410 µl/l of gas, $SO_2$: 675 µl/l of gas, $O_2$: 22,871 µl/l of gas.

The temperature within the bed was raised gradually from 300 K to 700 K.

Figure 3:
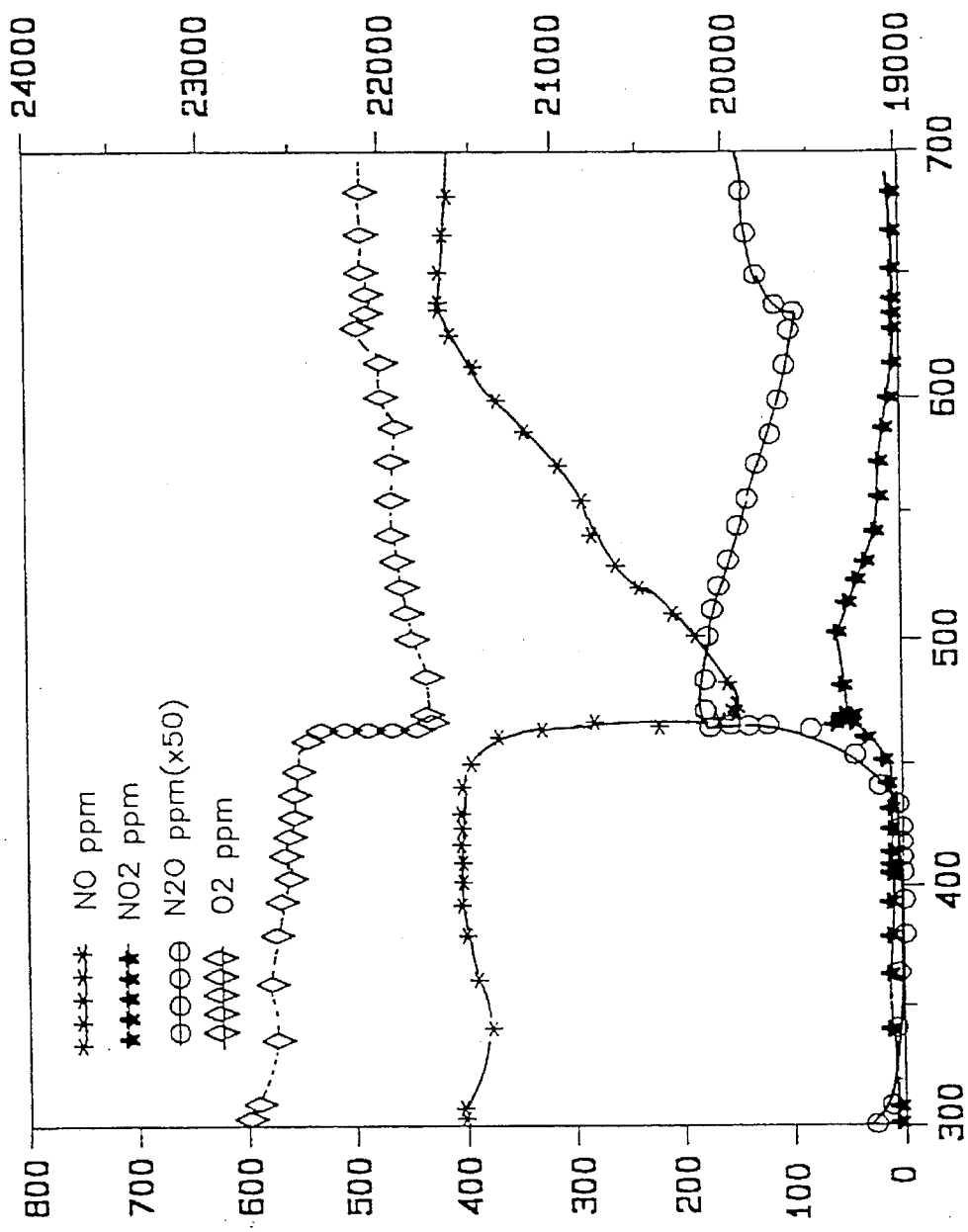

The results of the test are reproduced in the diagram of FIG. 3, where the abscissa represents the temperature of the gas on entering the bed (expressed in kelvins), the left-hand ordinate represents the volume concentration of each of the constituents NO, $NO_2$ and $N_2O$ in the gas on leaving the bed (these volume concentrations being expressed in ppm or µl of constituent per l of gas and requiring division by 50 in the case of $N_2O$) and the right-hand ordinate represents the volume concentration of oxygen in the gas on leaving the bed (expressed in ppm or µl of oxygen per l of gas).

It is observed that the gas has undergone optimum cleaning at temperatures of between approximately 450 and 500 K. At a temperature of approximately 425 K, the gas leaving the bed had the following approximate composition:

NO: 150 µl/l;

$NO_2$: 50 µl/l;

$N_2O$: 3 µl/l;

$O_2$: 22,200 µl/l.

SECOND SERIES OF EXAMPLES

Examples 4 and 5 below serve to indicate the effect of the respective concentrations of oxygen and sulphur dioxide in the gas to be cleaned.

Example 4

The test of Example 1 was repeated with a synthetic gas consisting essentially of argon, nitrogen monoxide (410 µl), sulphur dioxide (675 µl) and various concentrations of oxygen.

Figure 4:
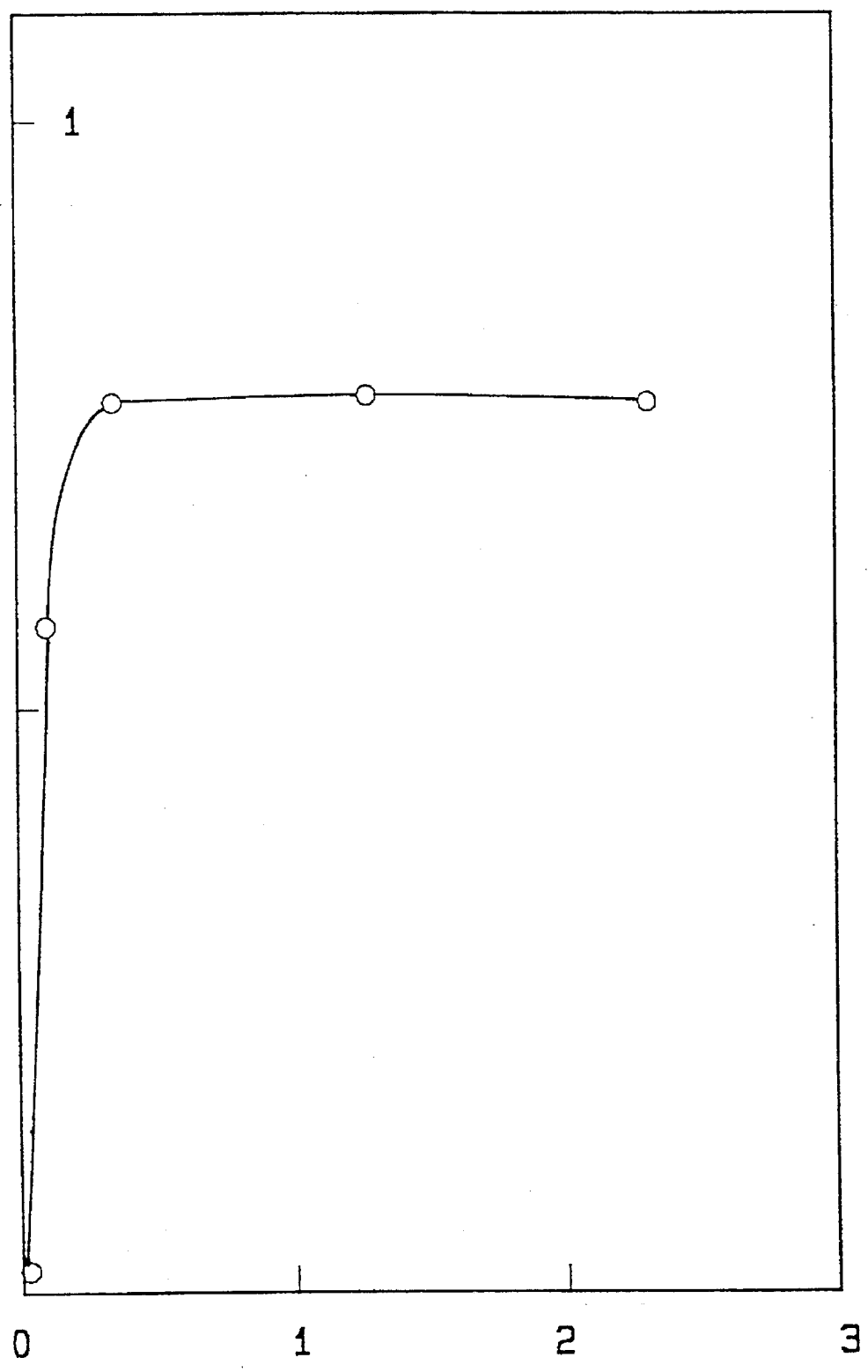
FIGS. 4 and 5 are two diagrams which show, respectively, the effect of the concentrations of oxygen and of sulphur dioxide on the degree of cleaning of the gas to remove nitrogen monoxide.

Four tests were carried out with four different volume concentrations of oxygen. In each test, the gas was circulated through a fluidized bed of 6 g of sodium bicarbonate, as in Example 1, and the degree of removal of oxides of nitrogen $NO_x$ from the gas was measured. The results obtained are reproduced in the diagram of FIG. 4, in which the abscissa represents the volume concentration (in %) of oxygen in the gas on entering the bed and the ordinate expresses the fraction by volume of oxides of nitrogen ($NO_x$) removed from the gas by the end of the test. The diagram indicates that the cleaning of the gas to remove oxides of nitrogen is optimum when the volume concentration of oxygen within the gas exceeds approximately 0.2%. Consequently, even concentrations of 0.3 to 0.4 are sufficient for thorough cleaning. It is therefore noted that thorough cleaning of the gas to remove oxides of nitrogen is obtained even for molar ratios of $O_2$:NO of approximately 7.

Example 5

The test of Example 1 was repeated with a synthetic gas consisting essentially of argon, nitrogen monoxide (410 µl), oxygen and sulphur dioxide, and the content of sulphur dioxide was varied while maintaining the volume concentration of oxygen in the gas at approximately 2.3%.

Figure 5:
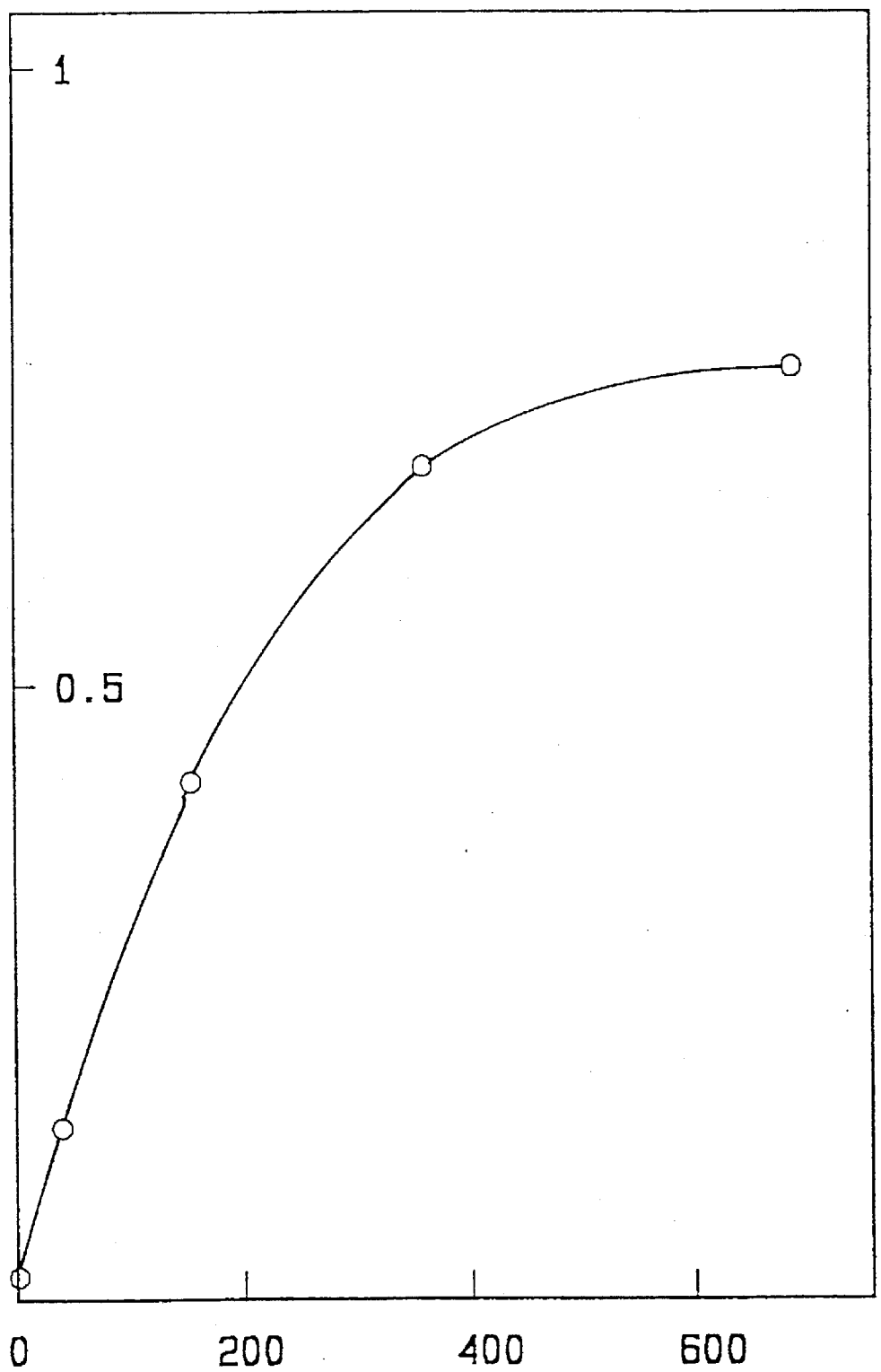

Five tests were carried out with five different volume concentrations of sulphur dioxide. In each test, the gas was circulated through a fluidized bed of 6 g of sodium bicarbonate, as in Example 1, and the degree of removal of oxides of nitrogen ($NO_x$) from the gas was measured. The results obtained are reproduced in the diagram of FIG. 5, in which the abscissa represents the volume concentration (in ppm) of sulphur dioxide in the gas on entering the bed and the ordinate expresses the fraction by volume of oxides of nitrogen removed from the gas by the end of the test. The diagram indicates that the cleaning of the gas to remove oxides of nitrogen increases with the concentration of sulphur dioxide in the gas, and tends towards a constant, optimum value when the volume concentration of sulphur dioxide in the gas is at least 600 ppm.

I claim:

1. A drug process for removing nitrogen monoxide from a gas mixture containing nitrogen monoxide and sulphur dioxide, comprising contacting a gas mixture originating from the combustion of a sulphur-containing fossil fuel or from the incineration of household or municipal refuse and containing nitrogen monoxide, sulphur dioxide, and oxygen with an alkali metal bicarbonate in solid form in the absence of liquid water, said sulphur dioxide present in an amount which is at least equal to the quantity theoretically required to form, by reaction with the alkali metal bicarbonate, a sufficient quantity of alkali metal pyrosulphite to consume all of the nitrogen monoxide and nitrogen dioxide in the gas, regulating the respective concentrations of oxygen and sulphur dioxide in the gas mixture in order to achieve molar ratios of $O_2$:NO of at least 1 and of $SO_2$:NO of greater than 0.2, regulating the temperature of the gas to between 400 and 700 K, and removing said nitrogen monoxide from said gas mixture.

2. The process according to claim 1, including a molar ratio of $O_2$:NO of at least 2.

3. The process according to claim 2, including a molar ratio of $O_2$:NO of greater than 5.

4. The process according to claim 1, including a molar ratio of $SO_2$:NO of at least 0.5.

5. The process according to claim 1, including a molar ratio of $SO_2$:NO of between 1 and 2.

6. The process according to claim 1, including a volume concentration of oxygen of at least 0.06% and a volume concentration of sulphur dioxide of at least 100 ppm.

7. The process according to claim 6, including a volume concentration of oxygen of at least 0.25% and a volume concentration of sulphur dioxide of at least 500 ppm.

8. The process according to claim 1, including more than 0.5 mol of alkali metal bicarbonate per mole of nitrogen monoxide in the gas mixture.

9. The process according to claim 8, including from 0.8 to 5 mol of alkali metal bicarbonate per mole of oxide of nitrogen in the gas mixture.

10. The process according to claim 1, wherein the gas mixture is contacted with the alkali metal bicarbonate at a temperature of between 400 and 500 K.

11. The process according to claim 1, wherein the alkali metal bicarbonate is sodium bicarbonate.

12. The process according to claim 1, wherein contacting said gas mixture with said alkali metal bicarbonate forms a solid residue comprising alkali metal nitrite and alkali metal nitrate, and removing said solid residue from said gas mixture.

* * * * *